United States Patent [19]

Seiberling

[11] 3,933,553
[45] Jan. 20, 1976

[54] TIRES, ETC
[75] Inventor: Theophilus K. Seiberling, Akron, Ohio
[73] Assignee: Mildred Kelley Seiberling, Arkon, Ohio ; a part interest
[22] Filed: Sept. 7, 1973
[21] Appl. No.: 395,346

Related U.S. Application Data
[63] Continuation of Ser. No. 321,421, Jan. 5, 1973, abandoned, which is a continuation-in-part of Ser. No. 838,512, July 2, 1969, abandoned.

[52] U.S. Cl. ................ 156/123; 152/357; 156/134; 161/239; 161/247
[51] Int. Cl.² ........................................ B29H 17/16
[58] Field of Search ........... 156/118, 123, 110, 133, 156/134; 260/22, 25

[56] References Cited
UNITED STATES PATENTS

| | | | |
|---|---|---|---|
| 1,289,771 | 12/1918 | Hopkinson | 156/123 |
| 2,776,699 | 1/1957 | Kindle et al. | 156/118 |
| 3,372,078 | 3/1968 | Fausti et al. | 156/110 R |

*Primary Examiner*—Clifton B. Cusby

[57] ABSTRACT

The inner surface of a green tire provided with an air-sealing liner, is cured or partially cured to produce a steam- and water-resistant surface, and the tire after such treatment is cured in a usual press without an airbag or bladder.

One or more plies of a tire, usually the outer fabric plies, are partially cured before assembly in the tire, to insure that plies so located are cured, without over-curing inner and outer portions of the tire.

New tires are made by placing a carcass, whether green or partially cured, in a mold and extruding rubber over the outer surface of this carcass to fill the mold, and then giving the final cure to the resulting tire.

Tires are retreaded by applying ribbons of tread stock over the carcass prepared in any conventional manner, and then completing the cure without the use of a mold.

Retreaded tires are cured by placing a carcass prepared in any conventional manner, in a mold, extruding tread stock into the mold around the carcass, and then curing.

A tire, the inner surface of which is provided with a non-cured liner reinforced with a non-wicking fabric is cured without an air-bag or bladder.

Curing or partial curing may be effected by electron irradiation. Progressive irradiation is disclosed by which an object is repeatedly irradiated to attain a desired cure. Other methods of curing may be preferable in some operations.

3 Claims, 13 Drawing Figures

INVENTOR.
THEOPHILUS K. SEIBERLING
BY
ATTORNEY

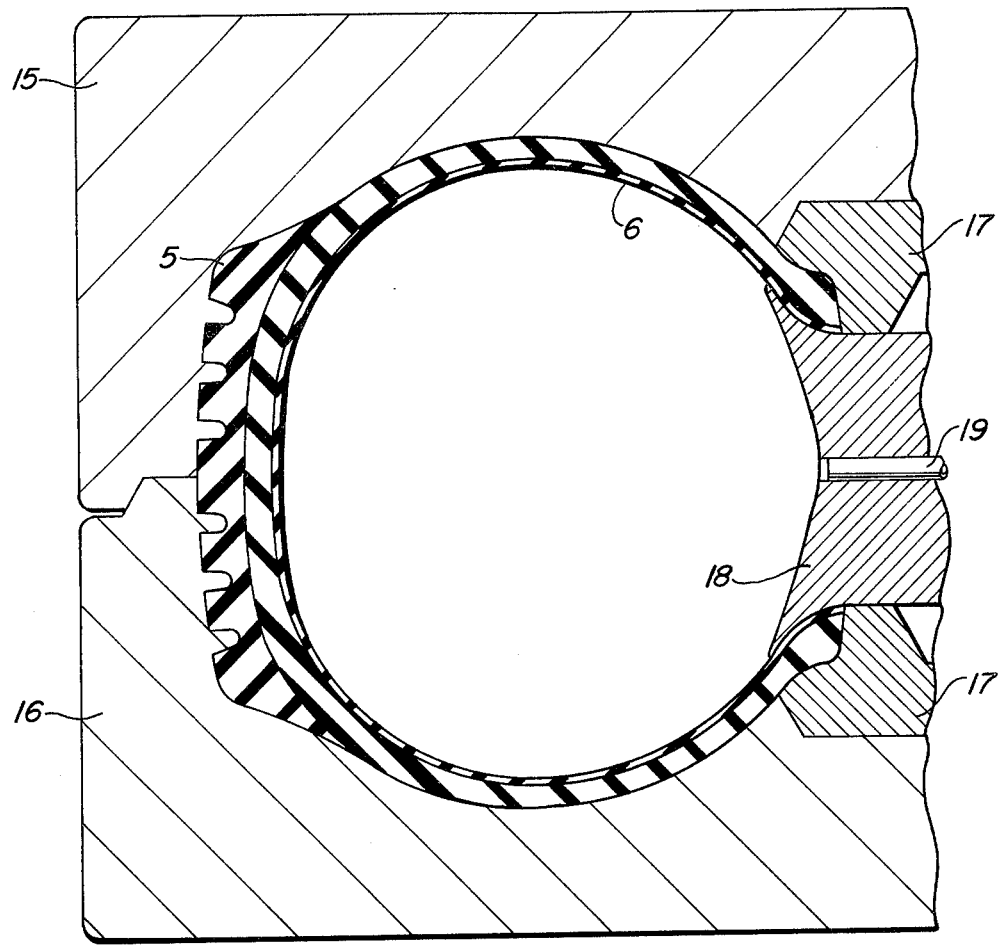
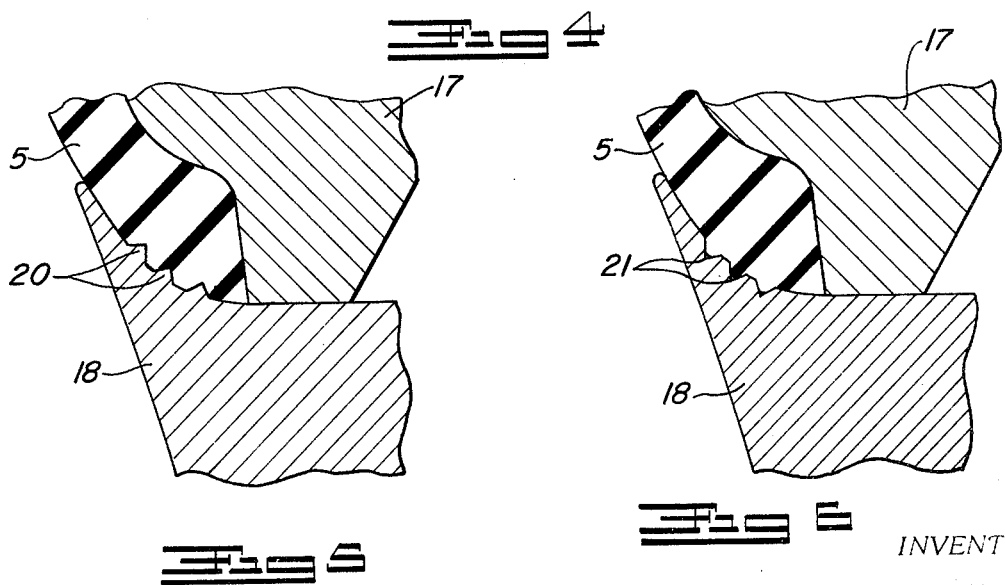

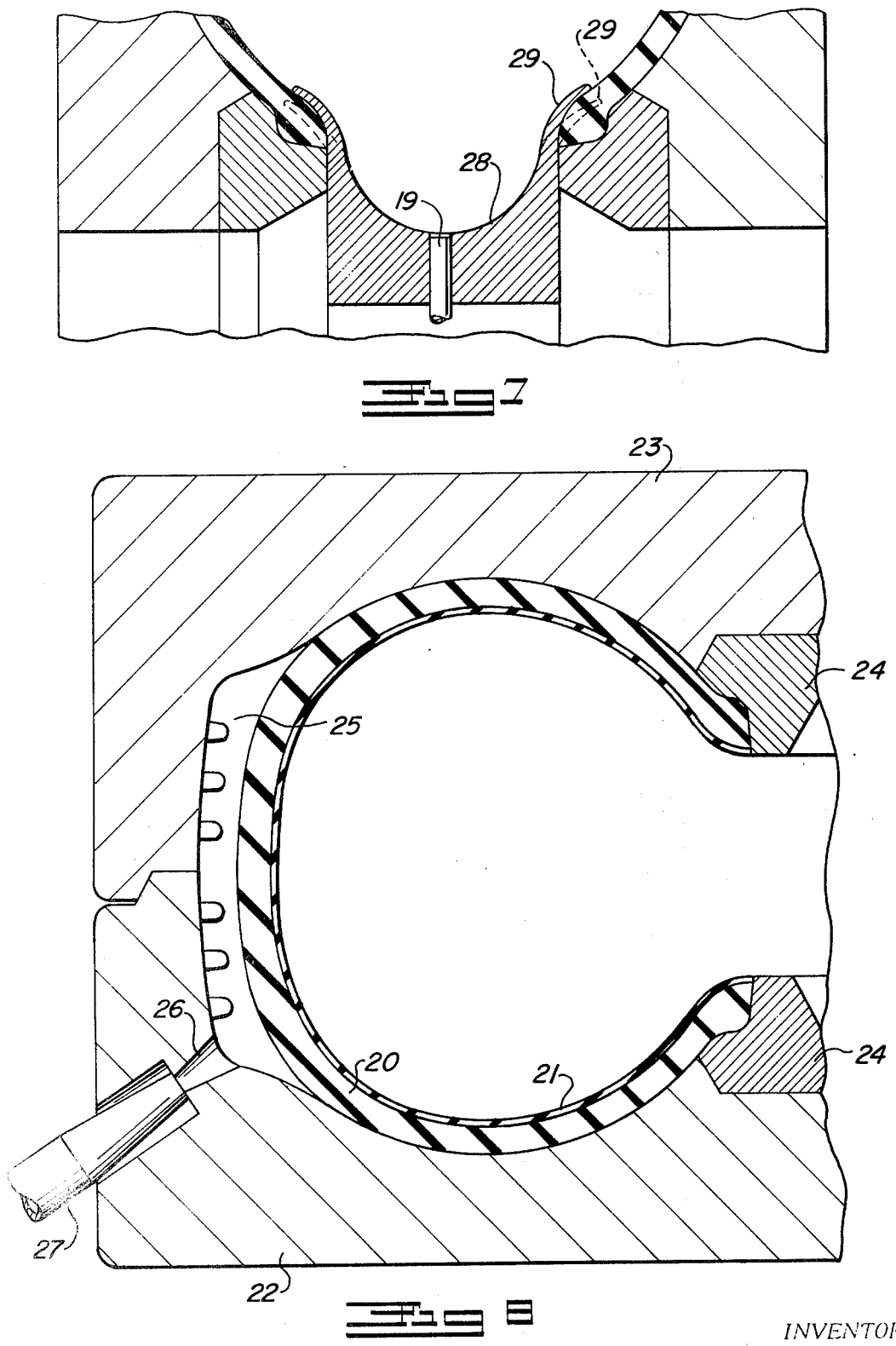

TIRES, ETC

This application is a continuation of application Ser. No. 321421, filed Jan. 5, 1973, which is a continuation-in-part of application Ser. No. 838,512 filed July 2, 1969. Both applications have been abandoned.

The invention relates more particularly to the use of electron radiation in the production of new tires and the retreading of old tires, although other means of radiation may be employed, and for most operations other means of curing may be used, as explained.

Electron radiation has been known for some years and in recent years equipment utilizing up to a million volts or more has become available for commercial use. The voltage employed determines the depth of penetration of the electron rays. For example, radiation generated by a million volts will penetrate an item having a density of 1 to a depth of 1/8 inch. By varying the voltage, the depth of the penetration may be varied. Thus, tires may be cured to a depth 1/8 inch or more, depending upon the rubber employed, the compounding formula, and the voltage used. By using higher voltages and radiating both surfaces of a tire, tires of much greater thickness may be cured. When only one surface is irradiated, beyond the depth at which the rubber is cured there is a partial curing which becomes less as the distance from the rubber surface increases.

The amperage will be varied depending upon the area subjected to radiation. The new equipment provides for irradiating an area of several square inches, up to, for example, 12 square inches or more.

By irradiating natural rubber or synthetics such as butadiene-styrene, polybutadiene, polyisoprene, etc., the molecular structure is rearranged. Irradiation has no beneficial effect on so-called "butyl" (copolymer of isobutene and either isoprene or butadiene) rubber. The rearranged rubber is partially or completely cured. By that it is meant that rubber which is thermoplastic when irradiated becomes partially or entirely thermoset (vulcanized) with or without sulfur.

Radiation may be used to treat a green tire or part of a green tire, or the tread in retreading, or plies used as a liner for a green tire or tread produced from ribbons of tread stock in retreading or the extruded tread stock in the manufacture of new tires or in retreading.

The rubber may be cured instantaneously by subjection to irradiation, and this may be done in a continuous operation in which the source of radiation and the rubber are moved continuously relatively to one another. Alternatively, the rubber may be cured by progressive irradiation. Progressive irradiation is accomplished by partially curing a piece of rubber in one exposure to the source of radiation, and then giving it one or more additional exposures each of which partially cures the rubber, until the rubber is cured. For example, by exposing the same rubber a number of times as by rotating a tire continuously and applying a thin layer of the rubber to the tire as it is rotated, and continuing the application of the thin layer throughout several rotations of the tire and as each thin layer is applied to the tire, exposing the rubber to irradiation to partially cure it so that as the tire is rotated a number of times in building up a desired thickness of the carcass or tread and by continuing the rotation a number of times after completing the application of the rubber, the rubber is progressively and completely cured.

The production of new tires will be discussed first, and in this connection reference will be made to the following figures;

FIG. 4 is a section through a mold containing a tire being cured without an air-bag or bladder, the inner surface of the liner being shown as that adapted to be contacted by the tire-inflating fluid and the outer surface of the liner being shown as that which is adapted to contact the tire carcass;

FIGS. 5 and 6 are enlarged details of a portion of a modification of the tire and mold shown in FIG. 4;

FIG. 7 is a section through a conventional mold containing a tire being cured without an air-bag or bladder;

FIG. 8 is a section through a conventional mold provided with means for extrusion of tread rubber into the mold.

Figure 10:
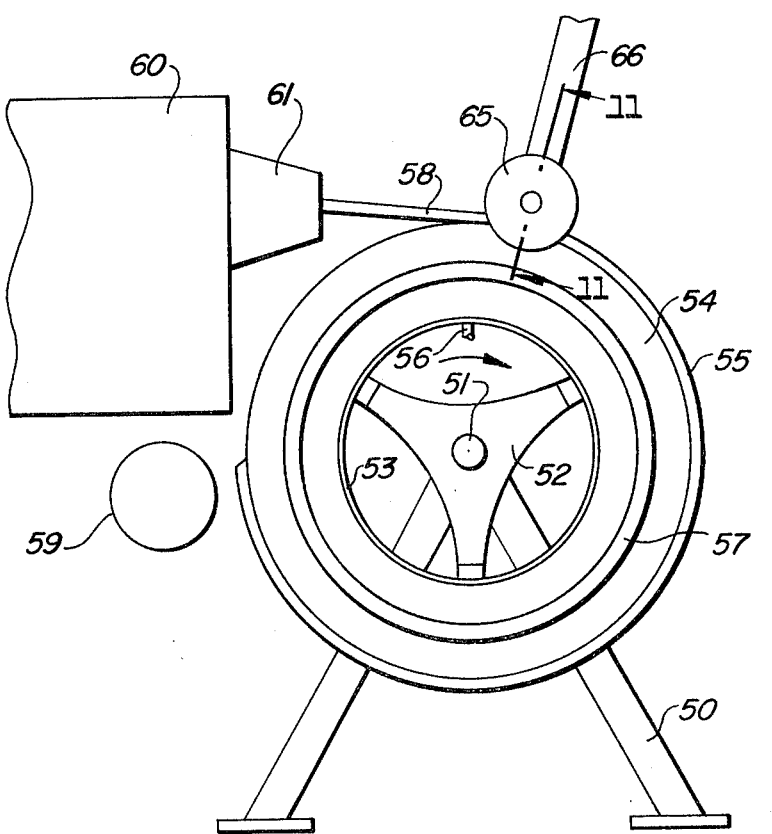
Figure 11:
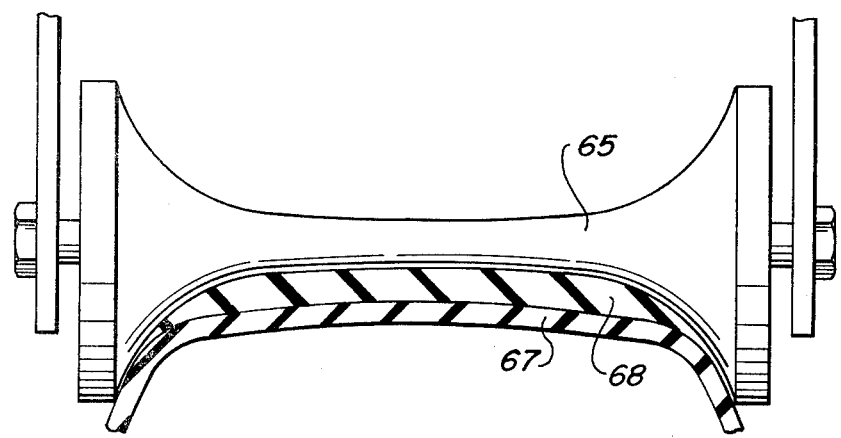
Figure 12:
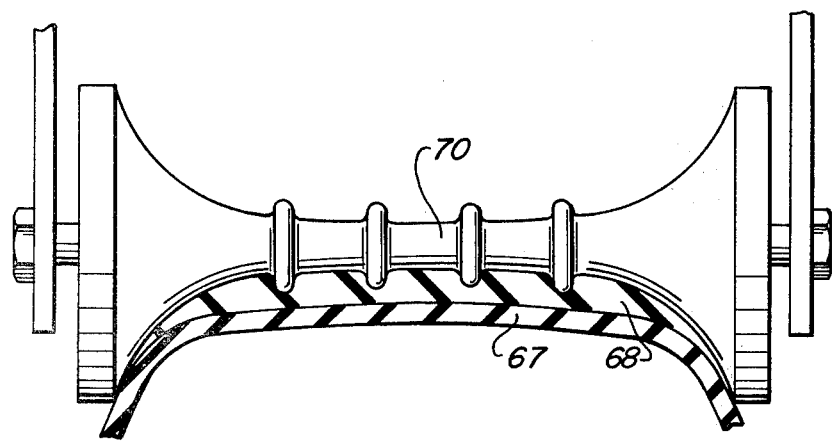

Then the retreading of tires will be discussed, and reference will be had to the following figures;

FIG. 10 is an elevation of a stand with a tire being retreaded on it, with the tread stock being extruded, and means for shaping the tread;

FIG. 11 is a section on the line 11—11 of FIG. 10 showing a roller that may be used for shaping the tread in position on a section through a tire being retreaded;

FIG. 12 is a section through a modified roller; and

Figure 13:
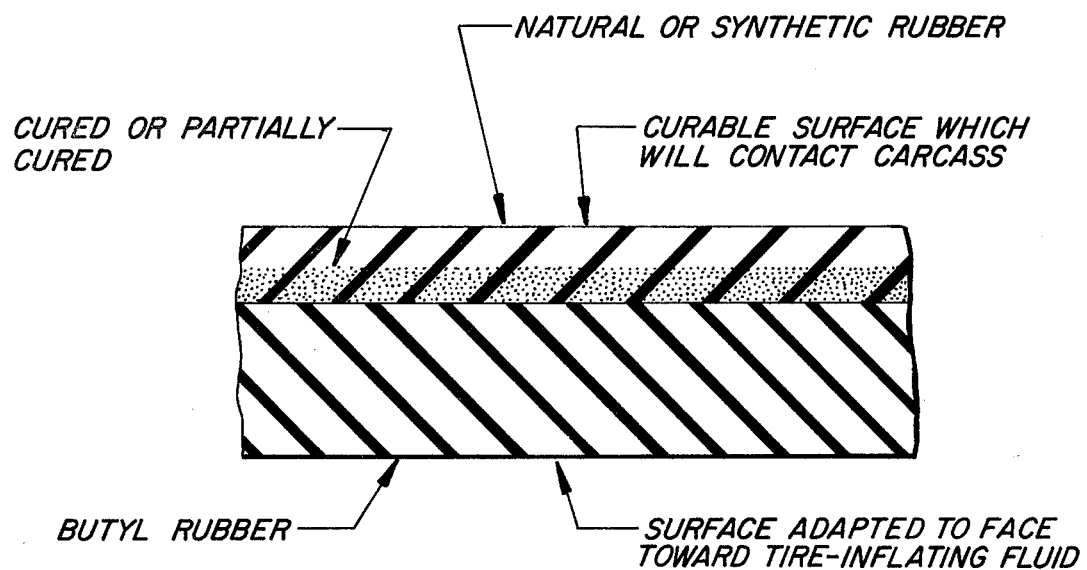

FIG. 13 is a section through the liner for the tubeless tire claimed herein.

NEW TIRES

Tires Cured Without an Air-Bag or Bladder

It has long been the wish of the industry to avoid the use of an air-bag or bladder in curing tires. The bag or bladder separates the inner surface of the green tire in a mold from the steam or hot water used to apply pressure to the bag or bladder to force the tire against the inner surface of the mold and thus remove air from the green tire and mold and subsequently cure the tire.

The invention relates to methods of curing the tire without an air-bag or bladder, and to methods which employ an air-bag or bladder.

According to one method, a green tire is formed in the usual manner, with a liner. Then this green tire is subjected to electron irradiation to cure the exposed inner surface or stratum to a depth of perhaps 1/16 inch or more, with partial curing at a greater depth; or only partially curing the exposed inner surface to a depth of perhaps 1/16 of an inch or more.

According to another method, a liner (such as is used in the production of tubeless tires) is partially cured or completely cured, and then this liner is used as the inner ply in building up a green tire. FIG. 13 is a modification of a liner such as is used commercially in the production of tubeless tires.

Liners to be cured or partially cured by irradiation must have incorporated in them sufficient natural rubber or synthetics which reacts to irradiation, to accomplish the degree of cure desired. If the liner is composed of butyl rubber or other rubber which is not cured by irradiation, it may be laminated to natural rubber or other rubber which can be so cured. This lamination would preferably be on the inner surface. Any of the plies may incorporate a reinforcing element, for example, non-wicking fabric. This ply of natural rubber or synthetic may be cured or partially cured by electron irradiation before the tire is cured and acts as a sealing element during the curing of the tire without an air-bag or bladder. The butyl ply is cured when the tire is cured in any conventional manner. Any of the plies may incorporate a reinforcing element.

Whether the liner is cured before or after being built into the tire, it is incorporated in the tire by joining its two narrower ends, usually by a beveled splice or by butting the two ends together to produce a band. To assure a good seal it may be advantageous to place a locking strip, such as a strip of uncured or partially cured stock over the joint and/or a ply of non-wicking fabric, such as is used in conventional tire-bead construction. This fabric may be incorporated in the strip as a stabilizer. The locking strip may be cured or partially cured as by irradiation or any other process, before the tire is placed in a mold and cured.

The inner surface of a green tire with a liner, whether the liner be cured before incorporation in the tire or whether the inner surface of the liner be cured after the green tire is formed, is resistant to the passage of steam or hot water used for inflation of the tire during molding. Therefore, this green tire can be cured in a mold without an air-bag or bladder. The mold may be of usual construction except that there is no provision for an air-bag, and modification for support and/or formation of the beads may be desirable.

Figure 1:
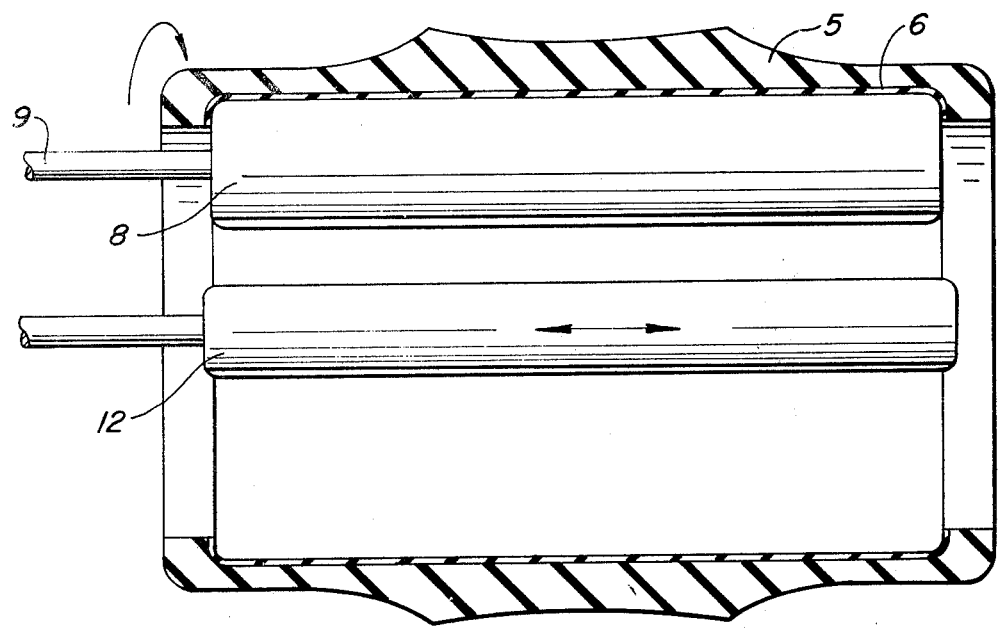
FIG. 1 is a section through a green tire with a liner with the inner surface being irradiated.
Figure 2:
FIG. 2 is a section of a small portion of a green tire with a liner after the inner surface has been irradiated.

FIG. 1 is an illustration of equipment that may be used for curing the liner of a green tire in which an uncured liner has been incorporated on the tire-building drum. The green tire 5, provided with the liner 6, is placed over a roller 8 the shaft 9 of which will ordinarily be mechanically driven, although it may be operated by hand. The green tire is readily placed over the roller as indicated in FIG. 1. Although the inner surface of the tire, and primarily the liner, may be cured by any means, it is preferably cured by electron irradiation. A suitable device 12 for effecting irradiation is moved into the position shown in FIG. 1 to effect the irradiation. Normally, a longitudinal section of 12, extending through approximately the entire width of the tire, will give off rays, and the entire inner surface of the tire will be irradiated by moving that surface under the longitudinal section by rotating the roller 8. Normally the irradiation will not be sufficient to cure any more than the inner surface of the liner to a depth of perhaps 1/16 inch. It may, however, cure the liner. FIG. 2 illustrates how, when the irradiation is controlled to cure only the inner surface of the liner 6', there is partial curing beyond the depth that is "firm cured". By "firm cured" we refer to sufficient cure to prevent steam or water penetrating the tire when subjected to curing in a mold. The outer surface of the liner may be partially cured or not cured.

Figure 3:
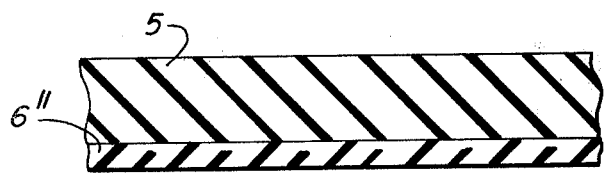
FIG. 3 is a section of a small portion of a tire provided with a pre-cured liner.

In the alternative method, the liner is cured or partially cured prior to assembly with the fabric plies. If usual methods of curing are utilized, the entire liner will normally be completely cured and it may be desirable to use an adhesive when assembling with the carcass. If the liner is cured by electron irradiation, the cure generally will only be a surface cure of perhaps 1/16 inch more or less. FIG. 3 illustrates a green tire, the liner of which has been partially cured by irradiation before assembly with the carcass. The inner surface of the liner has been completely cured, the opposite surface of the liner 6" is partially cured or may not be cured.

Thus, according to this invention, the liner may be pre-cured, completely or only partially, before incorporation in the tire, or it may be completely or only partially cured after being incroporated in the tire.

A reinforcing element such as a sheet of fabric made of non-wicking material, such as nylon monofilament, or a non-wicking fabric, such as is used in conventional tire-bead construction, may be incorporated on the inner surface or outer surface of the liner, or in between these surfaces. This liner will usually be composed of butyl rubber. A sheet of such fabric may be coated with natural or synthetic rubber in a conventional manner and be assembled with the tire adjacent to the liner, which may be made of butyl rubber, and preferably on the inner surface of the liner. The reinforcing element prevents moisture from getting into the carcass. The tire is built in a conventional manner and may be formed and/or cured in a mold without an air-bag or bladder.

FIG. 4 illustrates a mold for curing any of these tires, and it will be noted that no air-bag or bladder is utilized. The mold is constructed in any usual manner. It is shown as being formed of an upper part 15 and lower part 16 with two bead rings 17 fitted into the upper and lower parts to contact the beads of the tire 5. The liner 6 has been pre-treated or prepared in any of the ways previously discussed, so as to render it impervious to steam and hot water. The bead-sealing ring 18 may be inserted in the same operation that the conventional bladder or air-bag is inserted.

The ring 18 may be a bull ring made of steel or other metal, or it may be made of rubber or other hard elastomeric material. This ring may be segmented. The ring is placed between the beads of the tire before the mold is closed, and serves as a gasket.

To prevent leakage between the inner surface of the tire and this ring 18 when liquid pressure is generated in the tire, it may be desirable to provide irregularities in that portion of the surface of the ring 18 which is contacted by the tire at or above the beads, or both. These irregularities may be in the nature of projections 20 as shown on an enlarged scale in FIG. 5, or grooves 21 shown on an enlarged scale in FIG. 6. These run longitudinally around the circumference of the ring 18. The steam or hot water is led into the mold through the pipe 19 and provides sufficient pressure within the tire to force it against the mold to groove the tread and form any desired identification and indicia marks desired on the tire surface. In FIG. 7 the ring 28 is formed with spring extensions 29. Before the mold is closed these are in the position shown in dotted lines. As the mold is closed these extensions are pressed inwardly by the tire and shape the bead and form a tight seal. This ring 28 may be a steel ring or it may be of a firm rubber or resinous material. If made of material other than steel, the extensions 29 may be much thicker and the ring may be solid up to these extensions 29 and be compressible. Various devices may be employed to permit deflection of the outer surface of the member 29 from the position shown in dotted lines, to that shown in full lines.

The tire will be cured at usual temperatures, and steam or hot water is used in the usual manner, but without an air-bag or bladder. Air-bags and bladders are short-lived. By eliminating them, not only is the original cost eliminated but also the labor and other cost of frequent replacement are eliminated.

A new method of applying a tread to a green carcass is illustrated in FIG. 8. The carcass 20 is built up in a conventional manner, with or without liner 21, on a tire-building machine and the carcass 20 is placed in the mold shown in FIG. 8, which may be heated in the conventional manner, which comprises a lower part 22 and an upper part 23 with two bead rings 24 fitted into the upper and lower parts to contact the beads of the tire 20. The mold is conventional except for the orifice 26 through which tread rubber is injected, being fed from nozzle 27. A conventional air-bag or bladder may be used or the process using neither of these and previously described may be used. Hot water or steam under pressure is used to expand the green carcass against the sides of the mold. This pressure, before the tread is injected into the mold, may be less than conventional curing pressures and only sufficient to press the green carcass into position against the sides of the mold. The tread stock is injected at temperatures at which it flows readily under pressure, such as temperatures of approximately 280°F. and higher, through orifice 26 from nozzle 27.

The tread stock is usually introduced at or near the low point of the empty portion of the mold cavity outside of the carcass. It may be introduced at several points. As it is introduced, the air is vented through the air vents usually found in the tire mold, or separate vent means may be provided. When the tread has been injected the pressure in the tire is raised to conventional levels and the carcass is completely cured. It is impractical to thus inject tread stock which contains the usual quantity of sulfur and accelerator or the like for curing because the temperature required for rendering the rubber sufficiently fluid for injection is high enough to cure such stock. An exception is, when cold-feed extruders are used, in which case cold stock is fed into the machine and is raised to high temperatures only for a small increment of time before being extruded. According to this invention, the curing agent added to the tread rubber is only sufficient to partially cure the tread so that it may be removed from the mold after curing the carcass, without causing damage to the tread, such as blowing. The tire is then removed from the mold and the tread is cured by rearrangement of the molecules of the rubber in the tread stock, by irradiation or other means. An advantage of this method is the elimination of inventories of uncured treads with inherent savings such as floor space, investment, labor, etc.

Alternatively, if irradiation which penetrates to a sufficient depth is used, the tread may be cured in the mold before the tire is removed.

When tires are cured by irradiation, even though no sulfur be employed, reinforcing agents, antioxidants, antiozonants, etc. may advantageously be added.

Pre-Curing Certain Carcass Plies

It is common knowledge in the industry that when very thick tires are cured in a mold in the ordinary manner, either (1) outer carcass plies are only partially cured or (2) inner carcass plies are over-cured when the heat for curing is supplied internally by steam or hot water through an air-bag or bladder and additional steam or other means is provided for heating the mold. It is proposed to overcome this difficulty and shorten the curing time by pre-curing certain of the plies-- -either completely or preferably only partially. Ordinarily these will be several of the outer fabric plies, because the difficulty experienced has been encountered in attempting to insure the curing of these outer plies at the interface between the fabric plies and the tread, and usually in the outer fabric plies.

Other Methods of Manufacturing New Tires

Figure 9:
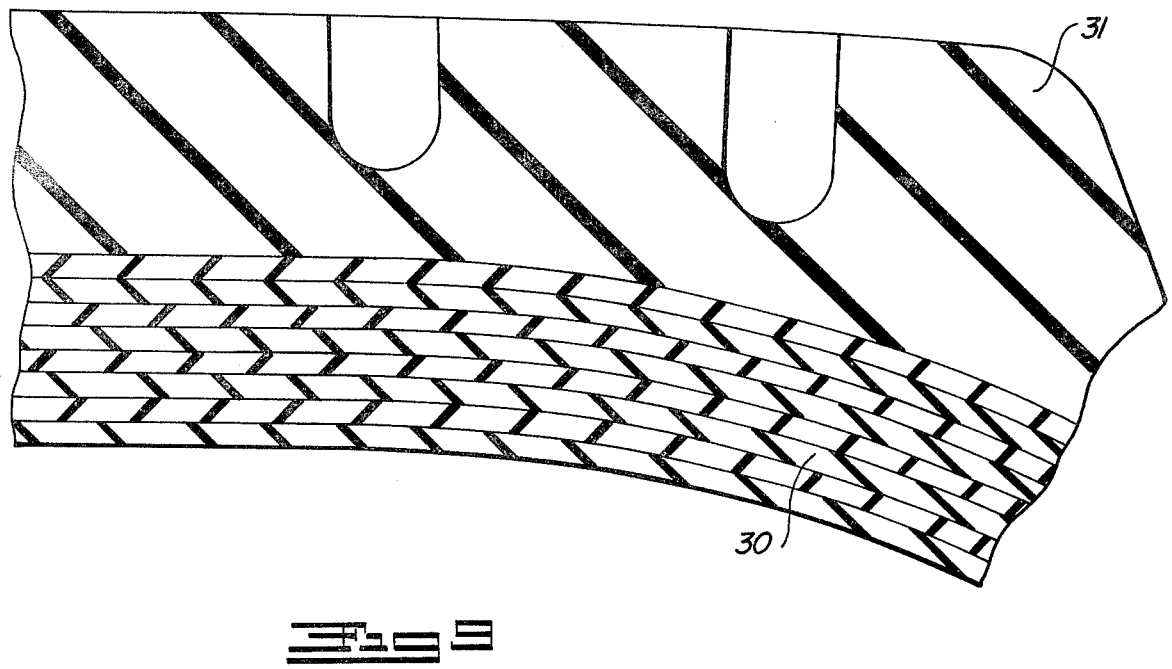
FIG. 9 is a section of a tire before curing, with several outer fabric plies pre-cured.

FIG. 9 shows a cross-section of a tire, with eight fabric plies 30 and tread 31, the carcass of which may be built in the usual manner. The portion of the carcass under the tread 31, prior to the assembly of tread 31, is subjected to electron irradiation and one or more of the plies may be partially cured or cured. The building of the tires is then completed in the usual manner. During the curing operation in the mold it will take less "time temperature" to cure such a tire because the plies under the tread have been pre-cured, than in the conventional method. Therefore, the result is a more uniformly cured tire. Also a shorter curing time is required in the mold which lowers cost. An adhesive may be employed between the carcass 30 and the tread 31.

Difficulty is experienced in uniformly curing the thickest portion of very large tires — that is, tires which comprise many plies, such as fifteen or twenty plies or more. The time required is also objectionably great. It is the section of the tire through the tread which is thickest and therefore most difficult to cure. To overcome this, it is proposed to precure, partially or completely, certain of the plies before the assembly of the tire is completed. It is not necessary to precure any of the inner plies because they are readily cured by heat from the steam or hot water used to inflate the tire in the mold. Thus, for example, if there are 20 plies in the tire, it is not necessary to pre-cure any of the first five plies. Thus the first 10 plies may be built on the drum in the usual manner. Then the outer surface of this partially built carcass, and preferably the center portion which is to come under the tread, is irradiated to partially cure the five outer plies. Then several more plies, for example five more, are built up in the usual manner and these are similarly cured. The last five are then applied and these are similarly treated, except, as the tire is enlarged, it may be desirable to further cure the outer plies than those which are located near the inside of the tire. If the tire is very large it may be desirable to vary the amounts of cure in the various segments as they are applied so that those plies which are farthest from the surfaces of the completed tire are cured to a greater degree than those nearer the surface. If the tread is very thin, the plies immediately under it will not be pre-cured to the same extent as those farther from the surface of the tread.

A desirable method of pre-curing is by progressive irradiation. This is accomplished by placing over the building drum a radiation device 12 which covers only the tread portion of the tire, as shown in FIG. 1. During the progressive irradiating operation the number of plies pre-cured in each group may vary and the number of groups may vary as well as the number of plies that are to be irradiated, depending on the thickness of the plies, compounding, voltage used, etc. The number of times the tire is rotated to pre-cure the different groups of plies may be varied to control the degree of cure in each group. This progressive curing with irradiation assures a more uniformly cured tire and a shorter curing time which will lower the cost.

In building a tire, certain of the plies may be precured before assembly on the drum. FIG. 9 shows a cross-section of a tire with eight fabric plies 30 and tread 31. It may be built in by the following method. A conventional tire-building machine is used and the first, second, third, fourth and fifth plies, for example, are assembled in the usual manner and are uncured. Then the sixth, seventh and eighth plies which have been partially or completely pre-cured are assembled into the tire. These cured or partially cured plies are so thin that they can be shaped as desired. Then the tread is added. If these cured plies are pre-cured by electron irradiation it is not necessary that they contain any sulfur, but they must be completely cured unless the subsequent curing of the tire is accomplished by irradiation. By only partially curing certain plies, adhesion between the partially cured and cured plies is improved. Adhesive may be employed to insure adhesion.

When a tire is built with many plies in the carcass, such as 20, it may be advantageous to use a combination of methods disclosed in these specifications. The conventional tire-building machine may be used. Also the conventional method of building a tire with the incorporation of irradiating and the use of pre-cured and/or partially pre-cured plies may be used. For example, the first, second, third, fourth and fifth plies are uncured, and are assembled in the usual manner. The next ten plies which are the sixth through the fifteenth, are partially pre-cured, as by irradiation, and assembled in the usual manner. Plies 16, 17, 18, 19 and 20 are uncured, and assembled in the usual manner. Then that portion of these last five plies which will be under the tread after it is assembled is irradiated and partially cured. The tread is then assembled and the tire is cured and finished in the usual manner.

This method assures a more uniform cure than the conventional method and shortens the cure time which saves cost.

RETREADING TIRES

Various ways are disclosed for retreading tires. In each case the carcass will be prepared for retreading in the usual manner by removing unwanted tread and, depending upon the shape of the retread which is to be applied, a part of the sidewall stock may be removed, all of which is customary in the different methods of retreading, using different equipment.

FIG. 8 shows a mold for extruding tread into position on the uncured or cured carcass of a new tire. The equipment of FIG. 8 and the general method there disclosed may be used for applying the tread to a carcass which is to be retreaded; this operation taking place after the carcass has been prepared in the usual manner. It may be desirable to use air at room temperature or cooler, and water at tap temperature or cooler in the tire to create pressure in the tire. It may also be desirable to so design the mold that the heating cavity is only approximately over the tread which is being applied.

The advantages of this method of retreading tires are elimination of tread building facilities and the inventories of prepared uncured treads all of which reduce costs. Also the carcass is subjected to less heat which has a deteriorating effect.

Instead of extruding the tread into a mold, the tread may be extruded onto a prepared carcass by rotating the carcass and using a suitably shaped nozzle that covers the width of the tread, or a narrower nozzle, the stock being reciprocated back and forth over the surface of the carcass to build up a retread. Suitable apparatus is illustrated in FIG. 10. The extruded rubber will ordinarily be heated to approximately 280°F. or lower or higher to made it sufficiently plastic to be used as described. It may or may not contain sulfur and/or curing agents and/or accelerators. Some volatile solvent may be added to the rubber which will be evaporated before the curing of the tread is commenced, although usually this will be avoided because of the danger of solvent vapor forming pockets in the tread.

The methods illustrated in FIGS. 10 and 11 are particularly designed for the retreading of airplane and truck tires which have a tread which is only grooved, but may be used for any tires. FIG. 10 shows stand 50 with axle 51 supporting wheel 52 with rim 53 on which the tire carcass 54 is mounted. A valve 56 in the rim through which the tire may be inflated gives it some rigidity during the application of the tread. The tire is provided with a scuff ring 57, but it is to be understood that tires of any shape and design may be retreaded by the method disclosed. As illustrated in FIG. 10, stock 58, sufficient to form the tread, is extruded from extruder 60 through nozzle 61. A forming tool 65 is positioned on the supporting means 66 to shape the tread as the tread stock is extruded; and if desired, forming tool 65 may exert some pressure to force the formed tread against the carcass. There may be additional forming tools, such as 65, at other points on the circumference of the tread for the purpose of shaping and/or pressure. After the tread is applied the tire may be rotated several times for the purpose of shaping and/or pressure.

The tread may be extruded with the proper tread outline and tread-forming tool 65 may be positioned on the supporting means 66 to maintain the proper shape and/or exert pressure on the tread to press it against the carcass. There may be other forming tools, such as 65, at other points on the circumference of the tire.

Another method of operating is to extrude the tread stock as a thin ribbon the width of the tread, while the tire is being rotated, and after quite a few rotations sufficient tread will be applied to build up the desired tread thickness. As the ribbons are being applied to the tire, the tread-forming roller will shape them to the proper design. A roller 70, such as illustrated in FIG. 12, may be used. The carcass 67 is shown with tread 68 built upon it.

Another method of operating is to extrude a tread stock as a thin, narrow strip while the tire is being rotated. The strip is oscillated back and forth across the tread portion and after quite a few rotations sufficient tread will be applied to build up the desired tread thickness. As the ribbon is being applied to the tire the tread-forming tool 65 or tools shape it to the proper design. A tire retreaded in manners just disclosed, is preferably cured by electron irradiation which may be accomplished by rotating tire and wheel 54 and 52, respectively, under a radiation device such as device 12 shown in FIG. 1; and, if desired, may be cured in a conventional manner or a combination of both. A grooved tread design may be cut into the tread by any conventional method or a groove may be rolled into the green tread by forming tool as shown in FIG. 12, preferably after the tread has been built up or while the last layer is being laid on the tread.

A method which is preferred is illustrated by FIG. 10. Stock 58, being a thin ribbon, for example, approximately ⅛ inch thick, and approximately the width of the tread, is extruded as the tire is rotated and the tread is built up to any desired thickness. Forming tool 65 shapes the tread and several other forming tools may be used. Radiation device 59, similar to or identical with device 12 in FIG. 1, is illustrated in FIG. 10. It only partially cures the tread stock during each exposure as the stock is passed by it. The cure may, for example, be only a one-fourth cure. The radiation device may be adjusted to cure to a depth of ½ inch, more or less. At the completion of each rotation the surface stock is only partially cured and, therefore, the next layer of hot stock adheres to it. The stock is progressively vulcanized as the rotation continues and the successive layers are adhered to one another.

If the stock is one-quarter cured on each exposure, at the completion of the fourth rotation the first layer is fully cured, the second layer is three-fourths cured, the third layer is one-half cured, and the fourth layer is only one-fourth cured. This "progressive irradiation" continues until the last layer is applied and then the tire is given three additional rotations which cures the last three layers.

A ribbon not the full width of the tread may be used and oscillated back and forth across the tread surface until the desired tread thickness is obtained, the level of radiation being adjusted to obtain the proper cure.

Grooves in the tread may be made by the use of a forming tool such as the tool 70 shown in FIG. 12.

In each of the retreading operations in which the tread stock is cured by irradiation, this stock may include sulfur and other curing ingredients, or it may contain no such curing compositions because irradiation rearranges the molecular structure of the rubber and thus cures it. A small amount of sulfur may be included in such stock, and the extrusion will take place rapidly before the rubber becomes objectionably cured at the extrusion temperature. The amount of curing ingredients that can be incorporated in the stock will depend upon the extruding temperature and the length of time that the stock is maintained at this temperature. It is desirable to include a small amount of sulfur and accelerator so that the stock will cure to a slight extent after it has left the extrusion device and been shaped on the carcass. Such setting of the retreading stock will facilitate handling the retreaded tire before the cure is completed. If a normal amount of sulfur, etc. are included in the rubber, unless the time during which the stock is heated is very short, curing will set in and the rubber will become pre-cured before it is shaped on the carcass. An exception is, when cold-feed extruders are used, in which case cold stock is fed into the machine and is raised to high temperatures only for a small increment of time before being extruded.

The advantages of these methods of retreading include not heating the carcass in a mold, and, therefore, the life of the tire is increased and the tire may be retreaded a greater number of times, the curing time is shorter, press equipment is eliminated and inventories of green tread stocks are eliminated and thus savings in cost are made.

Apparatus and processes for forming treads and curing them by electron irradiation have been disclosed. These tread stocks may be of ordinary rubbers (except those which cannot be cured by electron irradiation, such as butyl rubber), and it has been explained that no sulfur is required for curing by irradiation. A desirable tread stock is a high molecular weight butadiene-styrene copolymer such as has been found desirable for tread stocks, but which is of high viscosity and difficult to handle in ordinary processing equipment. Reinforcing agents, anitioxidants, antiozonants, etc. may be included even though no sulfur is added.

I claim:

1. The method of making a liner for a pneumatic tire, which liner is composed of a plurality of rubber layers, which method comprises curing or partially curing the surface and the underlying stratum of a layer of the liner without curing the inner layer of the liner which layer is a butyl rubber and which is adapted to face toward subsequent tire-inflating fluid, and without completely curing the surface of the liner which is adapted to contact the tire carcass and laminating the layers, the uncured inner layer and the surface which is adapted to contact the tire carcass being otherwise suitable to be joined by a good seal when the ends of the liner are united.

2. The method of claim 1 in which the surface which is adapted to contact the carcass of the tire is not cured.

3. The method of claim 1 in which both (1) the surface which is adapted to contact the carcass of the tire and (2) the inner layer are cured when the tire is cured.

* * * * *